(12) United States Patent
Li et al.

(10) Patent No.: US 12,715,069 B2
(45) Date of Patent: Aug. 25, 2026

(54) THERMOS CUP VACUUMIZING DEVICE AND METHOD

(71) Applicant: ZHEJIANG HAERS VACUUM CONTAINERS CO., LTD., Jinhua (CN)

(72) Inventors: Jinfa Li, Jinhua (CN); Jinsheng Du, Jinhua (CN); Wei Li, Jinhua (CN); Yunsheng Sun, Jinhua (CN); Runjun Liu, Jinhua (CN); Yangbo Ou, Jinhua (CN)

(73) Assignee: ZHEJIANG HAERS VACUUM CONTAINERS CO., LTD., Jinhua (CN)

( * ) Notice: Subject to any disclaimer, the term of this patent is extended or adjusted under 35 U.S.C. 154(b) by 972 days.

(21) Appl. No.: 17/965,822

(22) Filed: Oct. 14, 2022

(65) Prior Publication Data

US 2023/0173612 A1 Jun. 8, 2023

(30) Foreign Application Priority Data

Dec. 8, 2021 (CN) ......................... 202111491873.3

(51) Int. Cl.
*B23K 26/20* (2014.01)
*A47G 19/22* (2006.01)
(Continued)

(52) U.S. Cl.
CPC ........ *B23K 26/206* (2013.01); *A47G 19/2288* (2013.01); *B23K 26/032* (2013.01);
(Continued)

(58) Field of Classification Search
CPC ............................ B23K 26/032; B23K 26/206
See application file for complete search history.

(56) References Cited

U.S. PATENT DOCUMENTS 4,162,390 A * 7/1979 Kelly .................. B23K 26/123
219/121.84
4,527,042 A * 7/1985 Shinohara ............. B23K 26/12
219/121.63

(Continued)

FOREIGN PATENT DOCUMENTS

CN 1583468 A 2/2005
CN 201586827 U 9/2010

(Continued)

OTHER PUBLICATIONS

CN 109175574 Translation (Year: 2019).*

*Primary Examiner* — Woody A Lee, Jr.
(74) *Attorney, Agent, or Firm* — Bayramoglu Law Offices LLC

(57) ABSTRACT

A thermos cup vacuumizing device and method are provided. The thermos cup vacuumizing device includes a pre-vacuumizing chamber, a heating chamber, a welding chamber, and a cooling chamber. A continuous conveying device is provided at a bottom of each of the chambers. The thermos cup vacuumizing device further includes a controllable and movable laser welding device and multiple transparent windows. A laser beam of the laser welding device passes through the transparent windows to melt a welding ball at provided at a hole in the center of the bottom of the thermos cup. A vertically movable inlet valve is provided at an inlet of the pre-vacuumizing chamber, and a vertically movable outlet valve is provided at an outlet of the cooling chamber.

15 Claims, 4 Drawing Sheets

(51) Int. Cl.

| | |
|---|---|
| ***B23K 26/03*** | (2006.01) |
| ***B23K 26/12*** | (2014.01) |
| ***B23K 37/04*** | (2006.01) |
| *F16L 59/065* | (2006.01) |

(52) U.S. Cl.

CPC .......... *B23K 26/1224* (2015.10); *B23K 37/04* (2013.01); *F16L 59/065* (2013.01)

(56) References Cited

U.S. PATENT DOCUMENTS

| | | | | |
|---|---|---|---|---|
| 5,117,086 | A * | 5/1992 | Boudot | B23K 26/1464 219/121.84 |
| 5,231,261 | A * | 7/1993 | Duthoo | B23K 26/0648 219/121.76 |
| 5,422,456 | A * | 6/1995 | Dahm | B23K 26/282 219/121.64 |
| 10,632,564 | B2 * | 4/2020 | Azuma | B23K 26/103 |
| 11,071,411 | B2 * | 7/2021 | Mak | B23K 26/206 |
| 11,648,625 | B2 * | 5/2023 | Rouillon | H01M 8/0245 219/121.64 |
| 2010/0051828 | A1 * | 3/2010 | Doemer | B23K 26/032 250/492.1 |
| 2019/0231145 | A1 | 8/2019 | Mak et al. | |

FOREIGN PATENT DOCUMENTS

| | | | | |
|---|---|---|---|---|
| CN | 109175574 A | * | 1/2019 | B23K 1/0008 |
| CN | 209439564 U | | 9/2019 | |
| CN | 111761158 A | | 10/2020 | |
| CN | 112846497 A | | 5/2021 | |
| CN | 112894109 A | | 6/2021 | |
| JP | S57122280 A | | 7/1982 | |
| JP | S58224087 A | | 12/1983 | |
| JP | 3070210 U | | 7/2000 | |
| JP | 2006275499 A | | 10/2006 | |
| JP | 2007178038 A | | 7/2007 | |
| JP | 2012121036 A | | 6/2012 | |
| JP | 2021511261 A | | 5/2021 | |

* cited by examiner

THERMOS CUP VACUUMIZING DEVICE AND METHOD

CROSS REFERENCE TO THE RELATED APPLICATIONS

This application is based upon and claims priority to Chinese Patent Application No. 202111491873.3, filed on Dec. 8, 2021, the entire contents of which are incorporated herein by reference.

TECHNICAL FIELD

The present disclosure relates to a thermos cup processing device and more particularly to a thermos cup vacuumizing device and method for vacuumizing a cup body and welding a vacuumizing hole.

BACKGROUND

The insulation performance of existing thermos cups is determined by the vacuum degree of the interlayer of the double-layered cup body. The existing vacuumizing process is generally divided into a tailed vacuumizing process and a tailless vacuumizing process. The tailless vacuumizing process is more widely used by various enterprises in the industry due to its better sealing performance and higher reliability. In the tailless vacuumizing process, the vacuumizing hole of the thermos cup is sealed by a brazing material, which generally uses a glass substrate. The brazing material is melted at a high temperature in the vacuum furnace and melted with the vacuumizing hole at the bottom of the thermos cup, thereby realizing the vacuum insulation function of the thermos cup. The whole tailless vacuumizing process is performed under high-vacuum conditions. After the thermos cup is put into the vacuum furnace of the single-furnace vacuum machine, it undergoes a vacuumizing process involving normal-temperature low-vacuum pumping, high-temperature high-vacuum pumping, and cooling. This process has the problems of high energy consumption, long processing cycle (more than 5 hours per furnace), low production efficiency, and poor energy-saving effect, making it hard to meet the needs of existing automation.

To this end, technical personnel in the industry have made various improvements. Chinese patent application 201910255200.4 proposes a vacuum chamber and a continuous vacuumizing process for a vacuum-insulated cup. In this solution, the vacuum chamber includes a preheating chamber, a brazing chamber, and a cooling chamber in sequence from feeding to discharging. Chinese patent application 201821858591.6 proposes a fully-automatic high-vacuum brazing device for a thermos cup. In this solution, the brazing device includes a pre-vacuumizing chamber, a heating chamber, a welding chamber, a cooling chamber, and a cup outlet chamber, which are connected and arranged in sequence. These two solutions use multiple chambers because the existing vacuumizing process is split into two processes. However, the nature of the two solutions is still a sealing process using the glass-based brazing material. The glass-based brazing material is expensive and must be specially purchased or prepared and is not environment-friendly due to the inclusion of heavy metals. The melting temperature of the glass-based brazing material reaches more than 500° C., and it is black and has poor adsorption of the plastic powder for coating the cup body after being melted. In addition, the sealing process involves the welding of dissimilar materials so the welding efficiency is not high.

The brazing material is likely to fall off after the cup body is sealed, making it difficult to achieve the vacuum effect and resulting in a high scrap rate.

SUMMARY

An objective of the present disclosure is to provide a thermos cup vacuumizing device and method. The present disclosure greatly reduces costs, ensures welding quality, does not use heavy metals that pollute the environment, greatly reduces welding difficulty, improves product qualification rate and processing efficiency, saves energy and reduces emissions, and realizes automated mass production.

To achieve the above objective, the present disclosure adopts the following technical solutions.

Technical Solution 1. The thermos cup vacuumizing device includes a pre-vacuumizing chamber, a heating chamber, a welding chamber, and a cooling chamber, which are arranged in sequence, where every two adjacent chambers are communicated or isolated through a vertically movable gate valve. A continuous conveying device is provided at a bottom of each of the chambers. The pre-vacuumizing chamber, the heating chamber, and the welding chamber each are provided with a heating device. The thermos cup vacuumizing device further includes a controllable and movable laser welding device provided above the welding chamber. Multiple transparent windows are provided on the top surface of the welding chamber. A laser beam of the laser welding device passes through the transparent windows to melt a welding ball provided at a hole in the center of the bottom of the thermos cup. The heating chamber and the welding chamber are connected to a high-vacuum pumping system. The pre-vacuumizing chamber and the cooling chamber are connected to a low-vacuum pumping system. A vertically movable inlet valve is provided at an inlet of the pre-vacuumizing chamber, and a vertically movable outlet valve is provided at an outlet of the cooling chamber.

Preferably, the thermos cup vacuumizing device further includes a controllable and movable visual scanning camera provided above the welding chamber.

Preferably, the transparent windows are made of high-temperature resistant glass and have a visible range that covers all thermos cups. The transparent windows have the same number as and are in one-to-one correspondence with the thermos cups, and each of the transparent windows is a square with a side length of 30 mm-60 mm or a circle with a diameter of 30 mm-60 mm.

Preferably, the continuous conveying device includes a track provided at the bottom of each of the chambers, a transmission mechanism provided on the outer side of each of the chambers, a controllable and movable feeding trolley provided on the track, and a feeding frame provided on the feeding trolley and configured to place the thermos cups. The transmission mechanism controls the feeding trolley to travel along the track and includes a transmission shaft assembly connected to a power source, a transmission gear provided at the rear end of the transmission shaft assembly, and a rack provided at the bottom of the feeding trolley and matched with the transmission gear for transmission.

Preferably, a position detection mechanism is further provided at each of the chambers. The position detection mechanism includes a sensing switch provided outside each of the chambers, a sensing piece that is signal-connected to the sensing switch, a detection rod having one end fixed to the sensing piece, a balance weight provided at the other end of the detection rod that penetrates the chamber, a striker provided at one end of a side of the feeding trolley close to the balance weight, and a magnet configured to provide a restoring force for the sensing piece. The contact transition surface between the striker and the balance weight is an arc surface. When the balance weight is in contact with the striker, the sensing switch is turned on or off through rotational deformation of the sensing piece to control the feeding trolley to be parked or run.

Preferably, ejection mechanisms are spaced apart. A loading platform in front of the pre-vacuumizing chamber and an unloading platform behind the cooling chamber each are provided with a track corresponding to the track of the continuous conveying device. At least three pairs of wheel hubs are provided at the bottom of the feeding trolley.

Preferably, the ejection mechanisms in each set are symmetrically arranged on the outer side of the track. An edge of the feeding frame protrudes from the edge of the feeding trolley. The ejection mechanisms each include an ejection rod, which is located below the edge of the feeding frame and connected to a power source. Under the action of the power source, the ejection rod pushes up the edge of the feeding frame to eject the feeding frame away from the feeding trolley.

Preferably, the feeding frame is provided with a positioning fixture, which is configured to place the thermos cup and is in insertion connection with the feeding frame.

Technical Solution 2. The thermos cup vacuumizing method uses the thermos cup vacuumizing device and includes the following steps:

S1: opening the inlet valve; allowing the feeding trolley carrying the feeding frame with the thermos cups to enter the low-vacuum pre-vacuumizing chamber from the loading platform and park at a designated position on the track; ejecting, by the ejection mechanisms, the feeding frame away from the feeding trolley, and exiting the feeding trolley from the low-vacuum pre-vacuumizing chamber to the loading platform; descending and resetting the ejection mechanisms carrying the feeding frame; closing the inlet valve; starting a low-vacuum pumping operation when a system detects that the inlet valve is closed; accelerating a pre-vacuumizing speed and starting preheating when a vacuum degree reaches $4\times10^{2}$ Pa; and stopping the preheating at 200° C.; and completing pre-vacuumizing when the vacuum degree reaches $4\times10^{-1}$ Pa;

S2: opening the gate valve of the high-vacuum heating chamber when the pre-vacuumizing is completed; ejecting, by the ejection mechanisms in the low-vacuum pre-vacuumizing chamber, the feeding frame; allowing a feeding trolley in the high-vacuum heating chamber to enter the low-vacuum pre-vacuumizing chamber and park at a designated position on the track; descending the ejection mechanisms to place the feeding frame on the feeding trolley; allowing the feeding trolley carrying the feeding frame to enter the high-vacuum heating chamber through the track, and closing the gate valve of the high-vacuum heating chamber valve, wherein at this time, step S1 is repeated in the low-vacuum pre-vacuumizing chamber; starting a high-vacuum pumping operation and heating a furnace to 450° C. when the system detects that the gate valve of the high-vacuum heating chamber is closed; and holding the temperature at 450° C. for 20 min to activate a getter when the vacuum degree reaches $1\times10^{-3}$ Pa;

S3: performing high-vacuum pumping synchronously in the high-vacuum insulated welding chamber and the high-vacuum heating chamber until the vacuum degree in the high-vacuum insulated welding chamber reaches 1×10-3 Pa and the temperature therein reaches 450° C. and is maintained; opening the gate valve of the high-vacuum insulated welding chamber valve after the getter is activated in step S2; allowing the feeding trolley carrying the feeding frame to enter the high-vacuum insulated welding chamber and park at a designated position through the track; ejecting, by the ejection mechanisms, the feeding frame away from the feeding trolley, and allowing the feeding trolley to return the high-vacuum heating chamber; descending and resetting the ejection mechanisms carrying the feeding frame, and closing the gate valve of the high-vacuum insulated welding chamber, wherein at this time, step S2 is repeated in the high-vacuum heating chamber; resetting a laser welding gun of the laser welding device to a zero position when the system detects that the gate valve of the high-vacuum insulated welding chamber is closed; and performing welding, by the laser welding gun, in sequence from the zero position through the transparent window according to a preset progress parameter that is corresponding to a spacing of the thermos cups on the feeding frame, such that the welding ball and the vacuumizing hole of the thermos cup are melted together to complete the welding;

S4: opening the gate valve of the low-vacuum cooling chamber when the welding is completed; ejecting, by the ejection mechanisms in the high-vacuum insulated welding chamber, the feeding frame; allowing a feeding trolley in the low-vacuum cooling chamber to enter the high-vacuum insulated welding chamber and park at a designated position through the track; descending the ejection mechanisms to place the feeding frame on the feeding trolley; allowing the feeding trolley carrying the feeding frame to enter the low-vacuum cooling chamber through the track, and closing the gate valve of the low-vacuum cooling chamber, wherein at this time, step S3 is repeated in the high-vacuum insulated welding chamber; monitoring a temperature and pressure in the low-vacuum cooling chamber when the system detects that the gate valve of the low-vacuum cooling chamber is closed; opening an inflation valve to fill the low-vacuum cooling chamber with air or nitrogen when the temperature in the low-vacuum cooling chamber drops to 230° C.; and completing cooling when the pressure in the low-vacuum cooling chamber is the same as an external pressure; and S5: opening the outlet valve when the cooling is completed; allowing the feeding trolley carrying the feeding frame to enter the unloading platform and park at a designated position through the track; unloading; and allowing the feeding trolley to return the low-vacuum cooling chamber, and closing the outlet valve, wherein at this time, step S4 is repeated in the low-vacuum cooling chamber.

Preferably, in step S3, before the laser welding device starts welding, the controllable and movable visual scanning camera provided above the welding chamber scans the welding positions of all the thermos cups through the transparent windows; and the laser welding gun performs welding at the welding positions through the transparent windows based on a visual scanning result, such that the welding ball and the vacuumizing hole of the thermos cup are melted together.

Compared with the prior art, the present disclosure has the following beneficial effects. 1. The present disclosure adopts laser welding, which involves normal-temperature low-vacuum pumping, high-temperature high-vacuum pumping, heat-preserved high-vacuum pumping and welding, and low-vacuum pumping and cooling. The present disclosure shortens the overall process flow, greatly reduces energy consumption, eliminates the use of glass-based brazing material, and reduces the cost of sealing materials. In addition, the present disclosure avoids the shortcomings of the glass-based brazing material, that is, the present disclosure reduces the temperature requirements for the vacuum sealing process, reduces energy consumption, and avoids environmental pollution caused by heavy metals. 2. The present disclosure uses metal welding balls of the same material as the cup body for laser welding, which improves the welding fastness and stability, and ensures that the color and the adsorption of plastic powder after sealing are consistent with the cup body, thereby improving the subsequent coating effect. 3. In the present disclosure, laser welding is performed at the transparent window, which ensures the normal progress of the laser welding, ensures the thermal insulation performance of the welding chamber, and improves the processing quality of the product. 4. In the present disclosure, the workpieces are continuously conveyed to each chamber through the continuous conveying device. Through the multi-chamber continuous vacuumizing operation, the present disclosure realizes mass production, reduces energy consumption, improves production efficiency, and can connect other production lines, thereby improving the degree of automation. In addition, each chamber can be provided with a door that opens and closes separately, such that each of the chambers can be inspected and repaired separately.

Further, the present disclosure also has the following beneficial effects. 1. The visual scanning camera is provided above the welding chamber and scans the welding position through the transparent window. According to the scanning result, the laser welding gun of the laser welding device performs the welding operation through the transparent window, thereby improving the welding positioning accuracy and welding quality. 2. The visible range of the transparent window covers all thermos cups, and the transparent window is made of high-temperature resistant glass. The design ensures the thermal insulation performance of the high-vacuum welding chamber, the smooth progress of the laser welding of the laser beam, and improves the welding quality. 3. The transparent windows and the thermos cups have the same number and one-to-one correspondence, which is convenient for the scanning of the visual scanning camera and the welding of the laser welding device, and also improves the thermal insulation performance of the welding chamber. 4. The thermos cups are placed on the feeding frame of the feeding trolley, and the feeding trolley conveys the thermos cups to each chamber through the track provided at the bottom of each vacuum chamber for vacuumizing. There are at least three pairs of wheel hubs at the bottom of the feeding trolley, which ensure the smooth transition of the feeding trolley on each section of the track, facilitate the continuous operation of the thermos cups, save energy, and improve production efficiency. 5. The striker hits the balance weight on the detection rod, and the sensing piece and the sensing switch at the other end of the detection rod control the parking or running of the feeding trolley. In this way, the feeding trolley can be parked at a designated position, thereby realizing accurate positioning and automatic operation of each of the chambers. 6. At least one set of ejection mechanisms is provided in every section of the track. Specifically, the ejection mechanisms are provided at the bottoms of the pre-vacuumizing chamber and the welding chamber, such that the two adjacent sections of the track at each end share one feeding trolley. The design effectively reduces the number of feeding trolleys and the ejection mechanisms and greatly saves costs. The ejection mechanisms in the welding chamber eject the feeding frame away from the feeding trolley. After the feeding trolley exits the welding chamber, the feeding frame is placed on the track for welding. The design improves the stability of the feeding frame and the welding accuracy. 7. The ejection mechanisms are symmetrically arranged on the two sides of the track, which can smoothly lift the edge of the feeding frame. 8. The feeding frame is provided with the positioning fixture, which is convenient for the positioning of the thermos cup at a designated position. In addition, the insertion connection design of the positioning fixture is suitable for different types of thermos cups, which expands the scope of application, facilitates rapid mold change, and greatly improves processing efficiency. 9. The progress parameter of the laser welding device can be changed according to the number of laser welding guns on the laser welding device. When there is one laser welding gun provided, the progress parameter can be set to weld the thermos cups one by one after zeroing. When there are two or more laser welding guns, the progress parameter can be set to weld the thermos cups row by row. When the number of the laser welding guns is the same as that of the thermos cups on the feeding frame, the progress parameter can be set to weld all the thermos cups on the feeding frame at one time. According to the specific conditions of the production line, an appropriate number of laser welding guns can be set and the welding progress parameter can be changed. The design has a wide range of applications and is easy to promote. 10. The laser welding device, the power source of the continuous conveying device, the position detection mechanism, and the transmission mechanism are all provided outside the vacuum furnace. The design avoids the problems of difficult heat insulation and the short service life of these mechanisms when they work in a high-temperature environment, reduces the space of the furnace chamber, simplifies the overall structure, saves energy, and facilitates maintenance.

DETAILED DESCRIPTION OF THE EMBODIMENTS

To make the technical solutions of the present disclosure clearer, the present disclosure is described in detail below with reference to FIGS. 1 to 7. It should be understood that the specific implementations described herein are merely intended to explain the present disclosure, rather than to limit the protection scope of the present disclosure.

Figure 7:
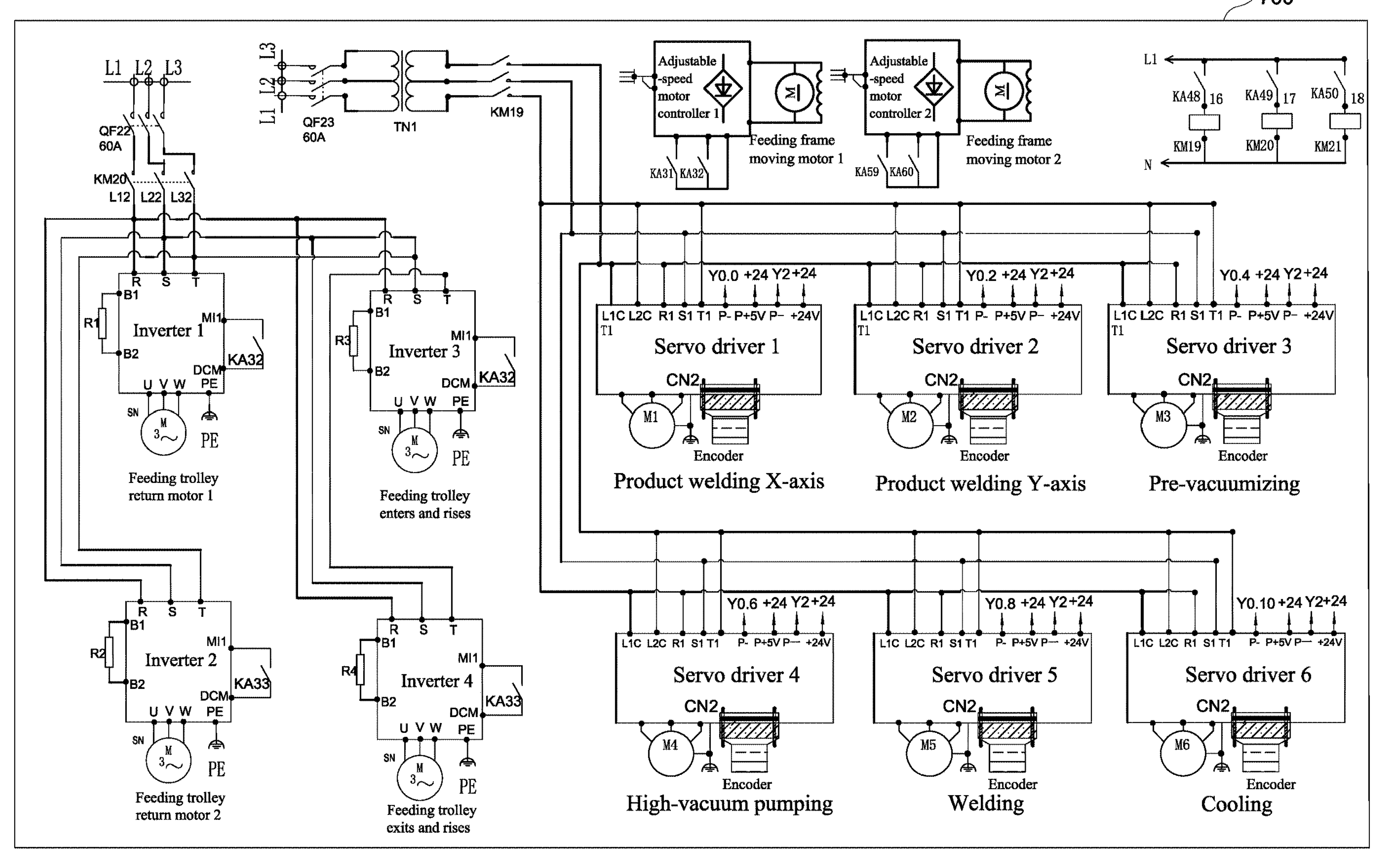
FIG. 7 is a circuit diagram 700 of the thermos cup vacuumizing device according to the present disclosure.

Embodiment 1: The thermos cup vacuumizing device is provided between loading platform 100 and unloading platform 200 and includes four vacuum chambers arranged in sequence along a conveying direction of workpieces to be processed. The vacuum chambers include pre-vacuumizing chamber 401, heating chamber 402, welding chamber 403, and cooling chamber 404. A continuous conveying device is provided at a bottom of each of the chambers, and a controllable and movable laser welding device 9 is provided above the welding chamber 403. The housing of each of the vacuum chambers is made of a 304 stainless steel or carbon steel. A metal heat shield includes at least three layers of metal materials, such as stainless steel and molybdenum. A controllable and vertically movable gate valve is provided between adjacent vacuum chambers to communicate or isolate every two adjacent chambers. The gate valves include inlet valve 70 located at an inlet of the pre-vacuumizing chamber 401, heating chamber valve 71 located between the pre-vacuumizing chamber 401 and the heating chamber 402, welding chamber valve 72 located between the heating chamber 402 and the welding chamber 403, cooling chamber valve 73 located between the welding chamber 403 and the cooling chamber 404, and outlet valve 74 located at an outlet of the cooling chamber 404. The gate valve and the vertical movement of the gate valve are prior art. In this embodiment, a chain, a balance gear matched with the chain, and an oil cylinder form drive mechanism 7 of the gate valve, but this embodiment is not limited to the vertical movement structure. The pre-vacuumizing chamber 401, the heating chamber 402, and the welding chamber 403 each are provided with a heating device. The heating chamber 402 and the welding chamber 403 are connected to a high-vacuum pumping system. The pre-vacuumizing chamber 401 and the cooling chamber 404 are connected to a low-vacuum pumping system. The heating device, the high-vacuum pumping system, and the low-vacuum pumping system are prior art. The low-vacuum pumping system includes a Roots pump and a spool pump. The high-vacuum pumping system includes a rotary-vane vacuum pump and a diffusion pump. The continuous conveying device is configured to continuously convey the workpieces to be processed to each chamber for the vacuumizing operation. Multiple transparent windows 10 are provided on the top surface of the welding chamber 403. A laser beam of the laser welding device 9 passes through each of the transparent windows 10 to melt welding ball 11 (FIG. 5) provided at a hole in the center of the bottom of the thermos cup. The welding ball 11 can be made of the same material as a cup body, such as iron, titanium, or stainless steel. The laser welding device 9 and a control mechanism thereof are prior art. The laser welding device 9 includes a laser welding gun. The control mechanism for controlling the movement of the laser welding device 9 may include a transverse transmission mechanism and a longitudinal transmission mechanism. The longitudinal transmission mechanism is provided on the transverse transmission mechanism to realize the free movement of the laser welding gun in transverse and longitudinal directions. The transmission mechanism of the laser welding gun may adopt a servo motor controlled by a servo driver and an encoder of a servo system. The servo system, the servo driver, the encoder, and the servo motor are prior art. Referring to FIG. 7, the welding in the transverse direction (X-axis) and the longitudinal direction (Y-axis) is controlled by two servo motors M1 and M2, respectively. The transparent window 10 is made of high-temperature resistant glass, and the transparent window 10 has a visible range that covers all thermos cups.

Figure 1:
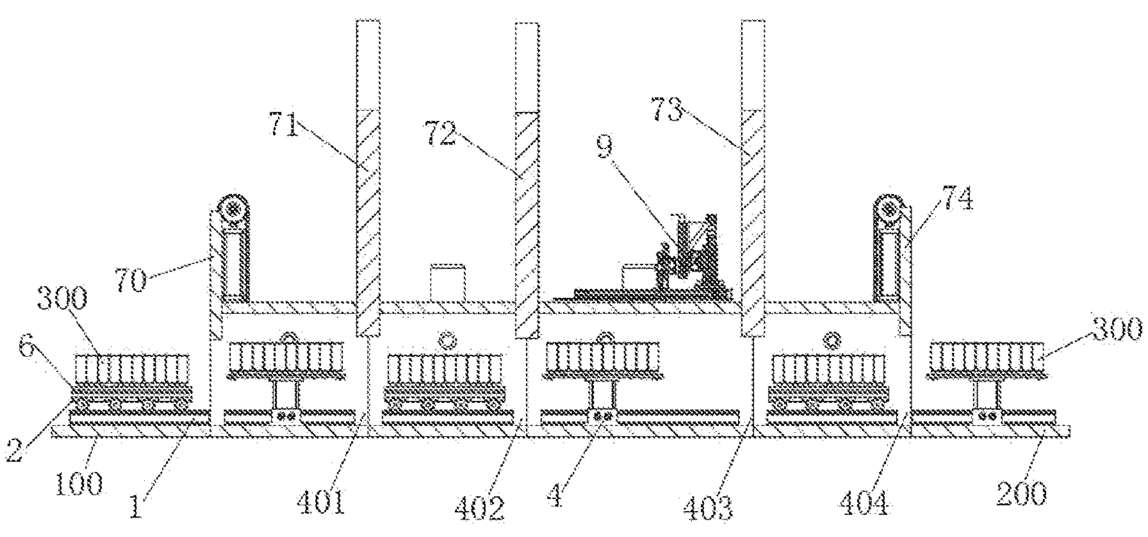
FIG. 1 is a structural view of a thermos cup vacuumizing device according to the present disclosure.
Figure 2:
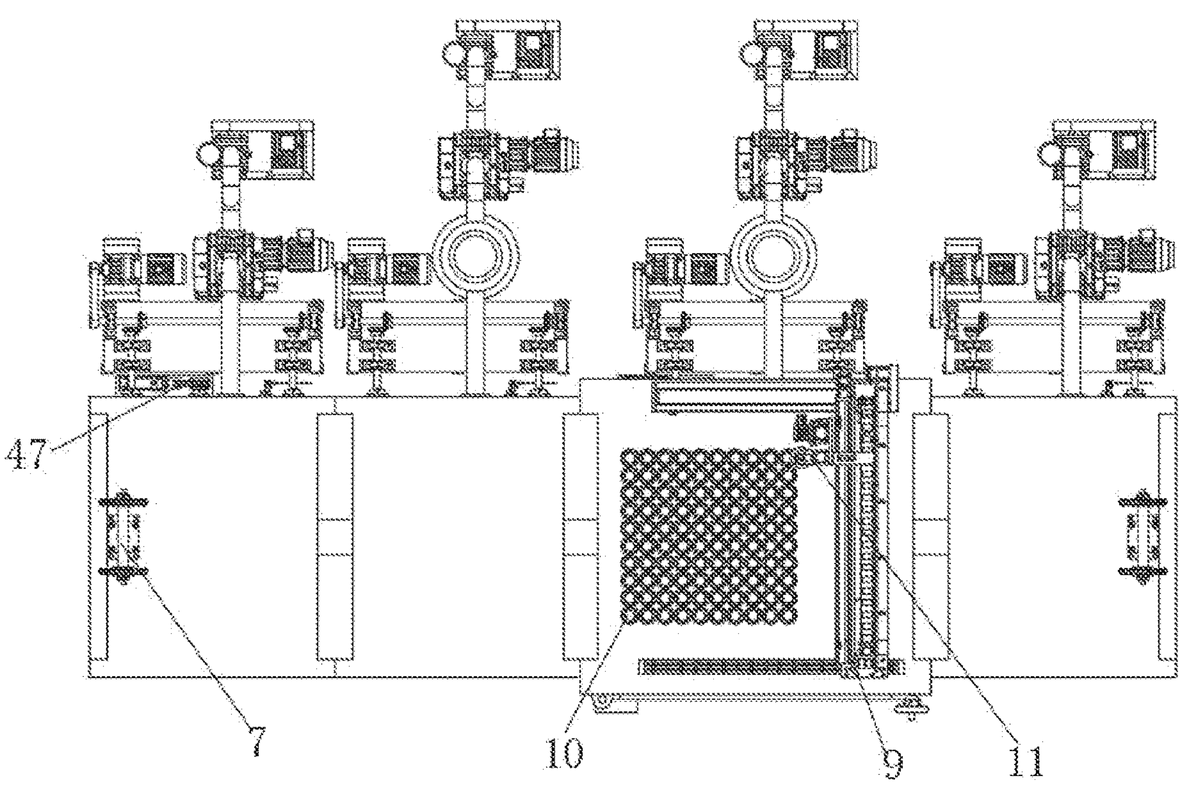
FIG. 2 is a top view of the thermos cup vacuumizing device according to the present disclosure.
Figure 3:
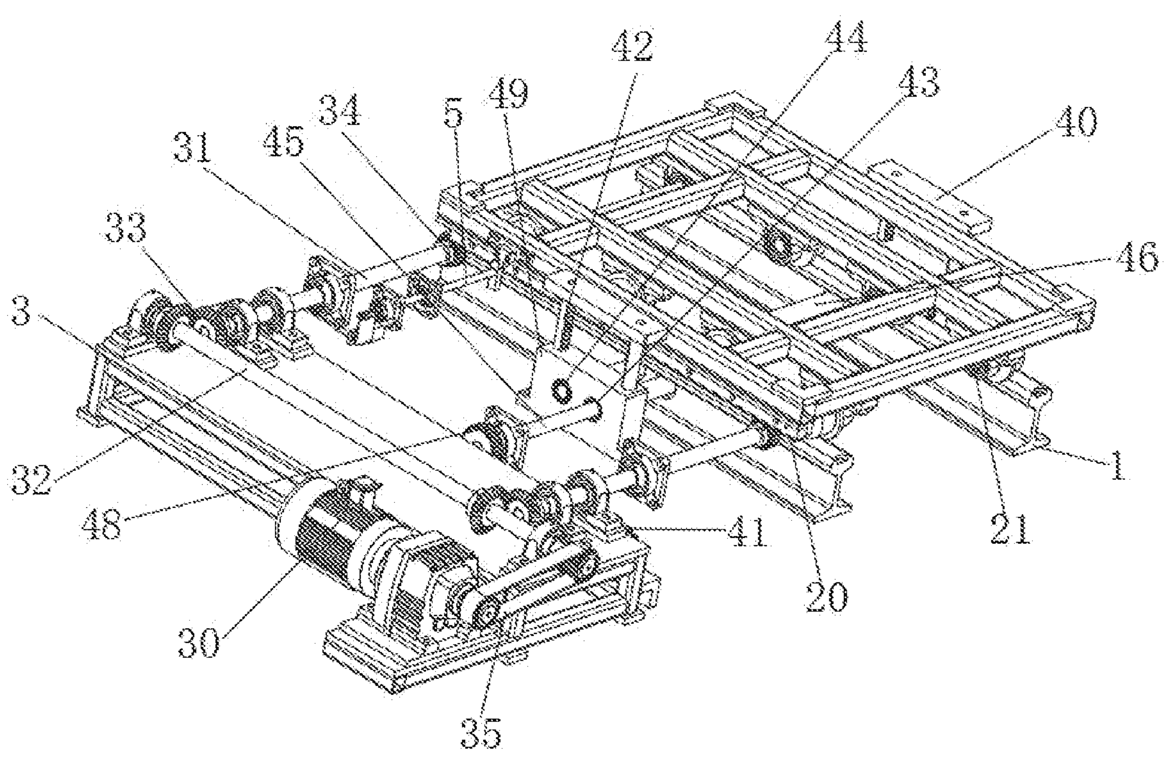
FIG. 3 is a structural view of a single section of a track in each chamber of the thermos cup vacuumizing device according to the present disclosure.

Referring to FIG. 2, in this embodiment, multiple transparent windows 10 are combined. The transparent windows 10 have the same number as and are in one-to-one correspondence with the thermos cups 300 on the continuous conveying device in the welding chamber. The transparent window 10 is a square with a side length of 30 mm-60 mm or a circle with a diameter of 30 mm-60 mm. The transparent window 10 ensures the thermal insulation performance of the welding chamber and the laser beam of the laser welding gun smoothly passes through each of the transparent windows to complete the welding. According to needs, the laser welding device may be provided with one laser welding gun to weld the thermos cups row by row and one by one or may be provided with more than two laser welding guns to weld the thermos cups row by row. In addition, the laser welding device may also be provided with welding guns with the same number as the thermos cups to complete the welding at one time, thus improving the welding efficiency.

The continuous conveying device includes a controller, track 1 provided at the bottom of each of the chambers, transmission mechanism 3 provided on a side of the track 1, feeding trolley 2 that is controllable and movable on the track 1, feeding frame 6 provided on the feeding trolley 2 and configured to place the thermos cups 300, ejection mechanisms 4, and position detection mechanism 5. The controller is connected to the control transmission mechanism 3, the position detection mechanism 5, and the ejection mechanisms 4. The feeding frame 6 is provided with a positioning fixture 8 for placing the thermos cup 300. The positioning fixture 8 includes a fixture body and a holding body provided in a rectangular array on the clamping body. The thermos cup 300 is placed on the holding body with a bottom facing up. The positioning fixture 8 and the feeding frame 6 are in insertion connection. The setting of the positioning fixture 8 is convenient for the fixed-point positioning of the thermos cup 300. The insertion connection of the positioning fixture 8 is convenient for a quick mold change and is suitable for different types of thermos cups, thereby expanding the scope of application and greatly improving processing efficiency. At least three pairs of wheel hubs 21 are provided at a bottom of the feeding trolley 2, and the wheel hubs 21 are located on the track 1. The feeding trolley 2 is running or parked on the track 1 through the transmission mechanism 3. Tracks corresponding to the track of the continuous conveying device are further provided on the loading platform 100 in front of the pre-vacuumizing chamber 401 and the unloading platform 200 behind the cooling chamber 404. The transmission mechanism 3 transmits the feeding trolley loaded with the thermos cups on the loading platform 100 to the pre-vacuumizing chamber 401, the heating chamber 402, the welding chamber 403, and the cooling chamber 404 in sequence. After the vacuumizing and welding operations are completed, the transmission mechanism transfers the thermos cups to the unloading platform 200. The transmission mechanism 3 controls the feeding trolley 2 to travel along the track 1. The transmission mechanism 3 includes a transmission shaft assembly connected to a power source, transmission gear 34 provided at the rear end of the transmission shaft assembly, and rack 20 provided at the bottom of the feeding trolley 2 and matched with the transmission gear 34 for transmission. Specifically, the transmission shaft assembly includes two transverse transmission shafts 31 perpendicular to the track 1 and a longitudinal transmission shaft 32 perpendicular to the transverse transmission shafts 31 and connecting the two transverse transmission shafts 31. Two ends of the longitudinal transmission shaft 32 are provided with bevel gear sets 33, respectively. The longitudinal transmission shaft 32 cooperates to transmit power to the two transverse transmission shafts 31 through the bevel gear sets 33. The transmission gear 34 is disposed at the rear end of the transverse transmission shaft 31, and the rack 20 at the bottom of the feeding trolley 2 is matched with the transmission gear 34. Motor 30 serves as a power source, and the motor 30 transmits power to the longitudinal transmission shaft 32 through transmission belt 35. The motor 30 drives the longitudinal transmission shaft 32 to rotate. Under the drive of the bevel gear set 33, the two transverse transmission shafts 31 rotate simultaneously, thereby driving the transmission gear 34 on the transverse transmission shaft 31 to rotate. Under the action of the transmission gear 34 and the rack 20, the feeding trolley 2 runs on the track 1. The motor 30, the longitudinal transmission shaft 32, and the bevel gear set 33 are arranged outside a vacuum furnace. The transverse transmission shaft 31 penetrates the vacuum furnace. The motor 30 may be a servo motor. The servo motor is controlled by the servo driver and the encoder of the servo system. The servo system, the servo driver, the encoder, and the servo motor are prior art. Referring to FIG. 7, the motors of the transmission mechanism in the four vacuum chambers in the vacuum furnace are denoted M3, M4, M5, and M6, respectively. They respectively control the feeding trolley 2 to enter the pre-vacuumizing chamber 401 for pre-vacuum pumping, the heating chamber 402 for high-vacuum pumping, the welding chamber 403 for welding, and the cooling chamber 404 for cooling.

The loading platform 100 and the unloading platform 200 are also provided with the transmission mechanism of the feeding trolley 2. The transmission mechanism may be the same as a transmission mechanism outside the vacuum chamber of the vacuum furnace. The motors in the transmission mechanisms of the loading platform 100 and the unloading platform 200 may also be connected to frequency converters. Referring to FIG. 7, the motors are controlled by the frequency converters.

The ejection mechanisms 4 are provided on two sides of the track 1, and at least one set of ejection mechanisms 4 is provided at every section of the track 1. The two ejection mechanisms in each set of ejection mechanisms 4 are symmetrically arranged on the two sides of the track 1. An edge of the feeding frame 6 protrudes from an edge of the feeding trolley 2, and the ejection mechanisms 4 eject the feeding frame 6 by jacking up the edge of the feeding frame 6. The ejection mechanism 4 includes an ejection rod located below the edge of the feeding frame 6, and the ejection rod is connected to the power source. Under the action of a power source, the ejection rod pushes up the edge of the feeding frame to eject the feeding frame away from the feeding trolley. The power source may be an oil cylinder. Specifically, the ejection mechanisms 4 each include oil cylinder 41, transmission rack 47, gear 48, main transmission shaft 45, secondary transmission shaft 46, ejection seat 49, ejection racks 42, input gear 43, output gear 44, and push plate 40. The oil cylinder 41 is the power source of the ejection mechanisms 4, and the oil cylinder 41 is connected to the transmission rack 47 to drive the reciprocating motion of the transmission rack 47. The gear 48 is matched with the transmission rack 47. The gear 48 is fixed on one end of the main transmission shaft 45, and the oil cylinder 41 transmits the power to the main transmission shaft 45 through the transmission rack 47 and the gear 48. The ejection seats 49 are symmetrically arranged on the two outer sides of the track 1. The input gear 43 and the output gear 44 form a gear pair. The input gear 43 and the output gear 44 are connected and arranged in the ejection seat 49. There are two ejection racks 42 symmetrically arranged in the ejection seat 49. The two ejection racks 42 are respectively matched with the input gear 43 and the output gear 44, and the ejection racks 42 are moveable vertically. The push plate 40 is vertically provided on the top of the ejection racks 42. The main transmission shaft 45 passes through the input gears 43 in the two symmetrical ejection seats 49 in sequence. The secondary transmission shaft 46 passes through the output gears 44 in the two ejection seats 49 in sequence. The edge of the feeding frame 6 protrudes from the edge of the feeding trolley 2. The push plate 40 is provided below the edge of the feeding frame 6. Driven by the oil cylinder 41, the transmission rack 47 drives the main transmission shaft 45 to rotate through the gear 48. Under the action of the input gear 43 and the output gear 44, the ejection racks 42 in the ejection seats 49 on the two sides of the track 1 move vertically synchronously, and the feeding frame 6 is jacked up or down.

Figure 4:
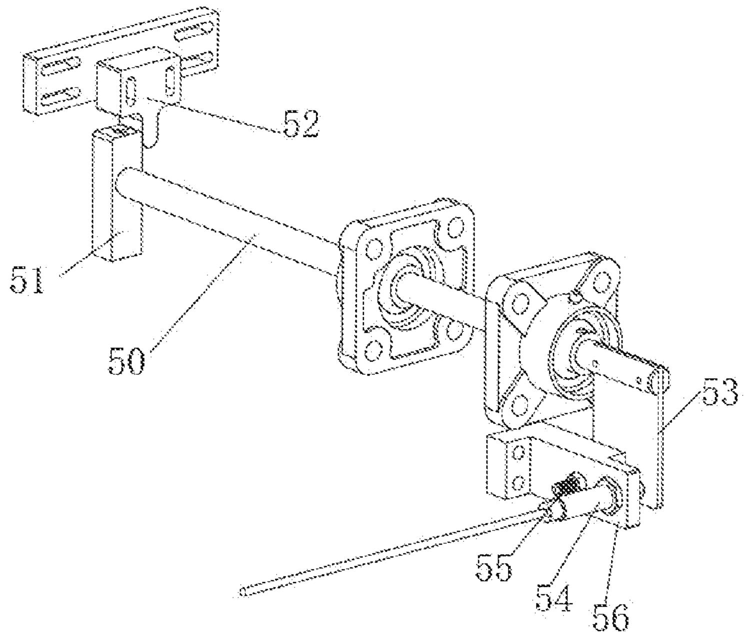
FIG. 4 is a structural view of a position detection mechanism of the thermos cup vacuumizing device according to the present disclosure.
Figure 5:
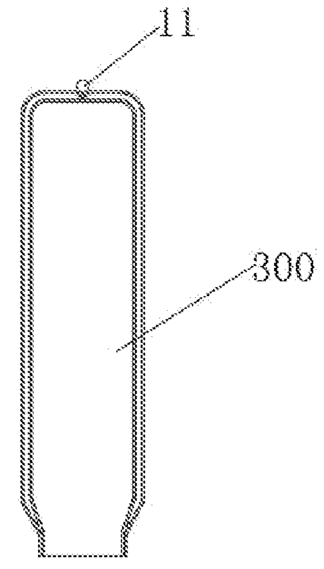
FIG. 5 is a structural view of a thermos cup to be processed by the thermos cup vacuumizing device according to the present disclosure.
Figure 6:
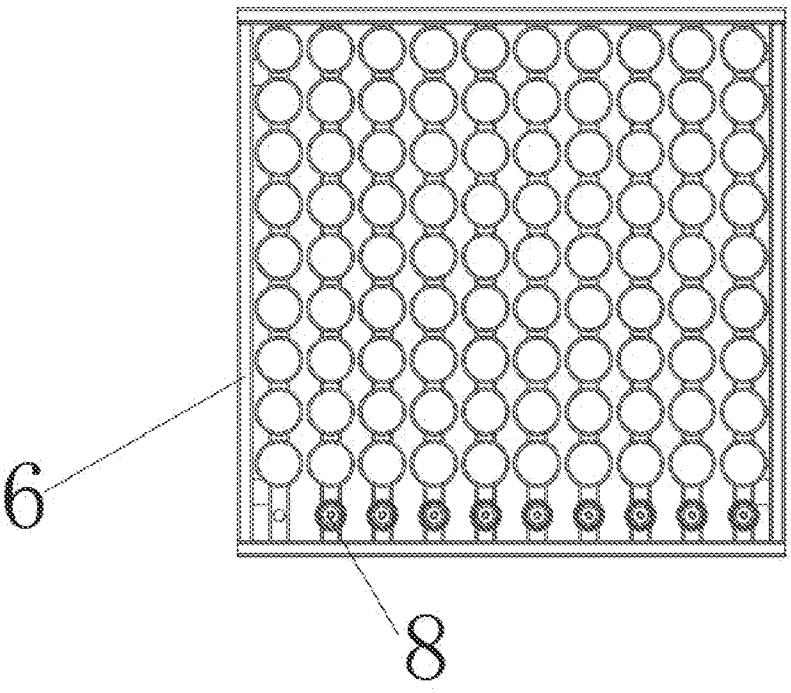
FIG. 6 is a top view of a feeding frame of the thermos cup vacuumizing device according to the present disclosure.

Referring to FIG. 4, the position detection mechanism 5 is provided outside the vacuum furnace and includes sensing switch 54, sensing piece 53, magnet 55, detection rod 50, balance weight 51, and striker 52. The sensing switch 54 is provided on mounting seat 56 outside the vacuum furnace, and the sensing piece 53 is connected to the sensing switch 54. The sensing piece 53 and the sensing switch 54 are prior art. The sensing piece 53 is a conductive metal sheet. The detection rod 51 is inserted inside and outside the vacuum furnace chamber. The balance weight 51 is provided at one end of the detection rod 50 that penetrates the vacuum chamber, and the sensing piece 53 is provided at the other end of the detection rod 50 that penetrates out of the vacuum chamber. The striker 52 is provided on a side of the feeding trolley 2 close to the one end of the detection rod 50. The magnet 55 is provided on the mounting seat 56, and the magnet 55 provides a restoring force for the sensing piece 53, such that the sensing piece 53 returns to its original position. A contact transition surface between the striker 52 and the balance weight 51 is an arc surface. When the feeding trolley 2 is running, the striker 52 is pressed against the balance weight 51. The balance weight 51 drives the detection rod 50 and the sensing piece 53 to rotate around the detection rod 50 by a certain angle. The sensing switch 54 detects and transmits a signal to the controller to control the parking of the feeding trolley. At this time, each vacuum chamber starts the designated operation. After the operation of each vacuum chamber is completed, the feeding trolley moves forward or backward. The striker 52 is separated from the balance weight 51. The sensing piece 53 is reset under the action of the self-weight of the balance weight 51. The cylindrical magnet 55 firmly attracts the sensing piece 53 to prevent it from swinging. The position detection mechanism 5 performs the positioning and parking of the feeding trolley 2, such that the feeding trolley 2 is parked at a predetermined position. The positioning is accurate, and the automatic operation of each vacuum chamber is realized.

Each vacuum chamber is further provided with an independent door, which is convenient for an engineer to enter the vacuum chamber to solve possible problems during the welding process. The door of the welding chamber 403 is also convenient for debugging the alignment of the laser welding gun and the thermos cup to improve processing accuracy.

The thermos cup vacuumizing method uses the thermos cup vacuumizing device and includes the following steps:

S1: The thermos cups 300 to be processed are loaded on the feeding frame 6 of the feeding trolley 2, and the inlet valve 70 is opened. The feeding trolley 2 enters the pre-vacuumizing chamber 401 from the loading platform 100 through the track and is parked at a designated position. The ejection mechanisms 4 eject the feeding frame 6 away from the feeding trolley 2, and the feeding trolley 2 exits the pre-vacuumizing chamber 401. The ejection mechanisms 4 drive the feeding frame 6 to descend, and the inlet valve 70 is closed. When a system detects that the inlet valve 70 is closed, the low-vacuum pumping operation is started. When a vacuum degree of $4\times10^{2}$ Pa is detected, the vacuumizing is accelerated, and the preheating is started. The heating is stopped at a temperature of 200° C. When it is detected that the vacuum degree reaches $4\times10^{-1}$ Pa, the pre-vacuumizing is completed.

S2: After the pre-vacuumizing is completed, the heating chamber valve 71 is opened. The ejection mechanisms 4 of the pre-vacuumizing chamber 401 eject the feeding frame 6. The feeding trolley in the heating chamber 402 enters the pre-vacuumizing chamber 401 through the track and is parked at a designated position. The ejection mechanisms 4 are descended and reset to place the feeding frame 6 on the feeding trolley. The feeding frame 6 enters the heating chamber 402 along with the feeding trolley through the track, and the heating chamber valve 71 is closed. At this time, step S1 is repeated in the pre-vacuumizing chamber 401. After the system detects that the heating chamber valve 71 is closed, the high-vacuum pumping operation is started, and the temperature in the furnace is increased to 450° C. When it is detected that the vacuum degree reaches $1\times10^{-3}$ Pa, a getter is activated by holding the temperature at 450° C. for 20 min.

S3: The welding chamber 403 and the heating chamber 402 perform high-vacuum pumping synchronously until the vacuum degree in the welding chamber 403 reaches $1\times10^{-3}$ Pa and the temperature therein reaches 450° C. and is maintained. After the getter is activated in step S2, the welding chamber valve 72 is opened. The feeding trolley carrying the feeding frame enters the welding chamber 403 through the track and is parked at a designated position. The ejection mechanisms 4 eject the feeding frame 6 away from the feeding trolley 2, and the feeding trolley 2 returns to the heating chamber 402. The ejection mechanisms 4 carrying the feeding frame 6 are descended, and the welding chamber valve 72 is closed. At this time, step S2 is repeated in the heating chamber 402. After the system detects that the welding chamber valve 72 is closed, the welding gun is reset to a zero position. Welding is carried out in sequence from the zero position according to a preset progress parameter (which corresponds to the spacing of the thermos cups on the rack). The welding gun melts the welding ball and the vacuumizing hole of the thermos cup to complete the welding.

S4: After the welding is completed, the cooling chamber valve 73 is opened. The ejection mechanisms in the welding chamber 403 lift the feeding frame 6, and the feeding trolley 2 in the cooling chamber 404 enters the welding chamber 403 through the track and is parked at a designated position. The ejection mechanisms 4 are descended and reset to place the feeding frame 6 on the feeding trolley 2. The feeding trolley carrying the feeding frame enters the cooling chamber 404 through the track, and the cooling chamber valve 73 is closed. At this time, step S3 is repeated in the welding chamber 403. After the system detects that the cooling chamber valve 73 is closed, the temperature and pressure in the cooling chamber 404 are monitored. When the temperature in the cooling chamber drops to 230° C., an inflation valve is opened to fill the cooling chamber 404 with air or nitrogen. The cooling is completed when the pressure in the cooling chamber is the same as an external pressure.

S5: After the cooling is completed, the outlet valve 74 is opened. The feeding trolley carrying the feeding frame enters the unloading platform 200 through the track and is parked at a designated position. After unloading, the feeding trolley 2 returns to the cooling chamber 404, and the outlet valve 74 is closed. At this time, step S4 is repeated in the cooling chamber 404. In this way, continuous operations are realized.

Embodiment 2: In Embodiment 1, a controllable and movable visual scanning camera may also be provided above the welding chamber. The visual scanning camera and a control mechanism for controlling the movement of the visual scanning camera are prior art. A moving mechanism of the visual scanning camera may include a transverse transmission mechanism and a longitudinal transmission mechanism. The longitudinal transmission mechanism is provided on the transverse transmission mechanism to realize free movement in transverse and longitudinal directions.

In Embodiment 1, in step S3 of the vacuumizing method, after the system detects that the welding chamber valve is closed, the visual scanning camera scans the welding position through the transparent window before welding begins. According to the scanning result, the laser welding gun performs the welding operation through the transparent window. The laser welding gun performs welding at designated positions according to the scanning result of the visual scanning camera. The design improves welding accuracy and welding process quality.

What is claimed is:

1. A thermos cup vacuumizing device comprising: a pre-vacuumizing chamber, a heating chamber, a welding chamber, and a cooling chamber arranged in sequence, wherein every two adjacent chambers of the pre-vacuumizing chamber, the heating chamber, the welding chamber, and the cooling chamber are communicated or isolated through a vertically movable gate valve;

a continuous conveying device is provided at a bottom of each of the pre-vacuumizing chamber, the heating chamber, the welding chamber, and the cooling chamber;

the pre-vacuumizing chamber, the heating chamber, and the welding chamber each are provided with a heating device;

the thermos cup vacuumizing device further comprises a controllable and movable laser welding device provided above the welding chamber;

at least one transparent window is provided on a top surface of the welding chamber;

wherein the controllable and movable laser welding device is configured to produce a laser beam that passes through the at least one transparent window to melt a welding ball provided at a hole in a center of a bottom of each of thermos cups;

the heating chamber and the welding chamber are connected to a high-vacuum pumping system;

the pre-vacuumizing chamber and the cooling chamber are connected to a low-vacuum pumping system;

a vertically movable inlet valve is provided at an inlet of the pre-vacuumizing chamber; and a vertically movable outlet valve is provided at an outlet of the cooling chamber, wherein the continuous conveying device comprises:

a first track provided at the bottom of each of the pre-vacuumizing chamber, the heating chamber, the welding chamber, and the cooling chamber, a transmission mechanism provided on an outer side of each of the pre-vacuumizing chamber, the heating chamber, the welding chamber, and the cooling chamber, a controllable and movable feeding trolley provided on the first track, a feeding frame provided on the controllable and movable feeding trolley and configured to place the thermos cups, a position detection mechanism provided at each of the pre-vacuumizing chamber, the heating chamber, the welding chamber, and the cooling chamber, and ejection mechanisms:

wherein the transmission mechanism controls the controllable and movable feeding trolley to travel along the first track, and the transmission mechanism comprises:

a transmission shaft assembly connected to a power source, a transmission gear provided at a rear end of the transmission shaft assembly, and a rack provided at a bottom of the controllable and movable feeding trolley and matched with the transmission gear for a transmission; and wherein the ejection mechanisms are provided below the feeding frame and are configured to eject the feeding frame away from the controllable and movable feeding trolley.

2. The thermos cup vacuumizing device according to claim 1, further comprising a controllable and movable visual scanning camera provided above the welding chamber.

3. The thermos cup vacuumizing device according to claim 2, further comprising a feeding frame, wherein the feeding frame is provided with a positioning fixture, the positioning fixture is configured to place each of the thermos cups and is in an insertion connection with the feeding frame.

4. The thermos cup vacuumizing device according to claim 1, wherein the at least one transparent window is made of a high-temperature resistant glass and has a visible range, the visible range covers all the thermos cups;

a number of the at least one transparent window is the same as a number of the thermos cups, and the at least one transparent window is in a one-to-one correspondence with the thermos cups; and the at least one transparent window is a square with a side length of 30 mm-60 mm or a circle with a diameter of 30 mm-60 mm.

5. The thermos cup vacuumizing device according to claim 4, further comprising a feeding frame, wherein the feeding frame is provided with a positioning fixture, the positioning fixture is configured to place each of the thermos cups and is in an insertion connection with the feeding frame.

6. The thermos cup vacuumizing device according to claim 1, wherein the position detection mechanism comprises:

a sensing switch provided an outside of each of the pre-vacuumizing chamber, the heating chamber, the welding chamber, and the cooling chamber, a sensing piece signal-connected to the sensing switch, a detection rod having a first end fixed to the sensing piece, a balance weight provided at a second end of the detection rod, the second end of the detection rod penetrating the pre-vacuumizing chamber, the heating chamber, the welding chamber, and the cooling chamber, a striker provided at one end of a side of the controllable and movable feeding trolley and being close to the balance weight, and a magnet configured to provide a restoring force for the sensing piece;

wherein a contact transition surface between the striker and the balance weight is an arc surface; and when the balance weight is in contact with the striker, the sensing switch is turned on or off through a rotational deformation of the sensing piece to control the controllable and movable feeding trolley to be parked or to run.

7. The thermos cup vacuumizing device according to claim 6, wherein the feeding frame is provided with a positioning fixture, the positioning fixture is configured to place each of the thermos cups and is in an insertion connection with the feeding frame.

8. The thermos cup vacuumizing device according to claim 1, wherein the ejection mechanisms are spaced apart;

a second track is provided on each of a loading platform in front of the pre-vacuumizing chamber and an unloading platform behind the cooling chamber, and the second track corresponds to the first track of the continuous conveying device; and at least three pairs of wheel hubs are provided at the bottom of the controllable and movable feeding trolley.

9. A thermos cup vacuumizing method using the thermos cup vacuumizing device according to claim 8, and comprising the following steps:

S1: opening the vertically movable inlet valve;

allowing the controllable and movable feeding trolley carrying the feeding frame with the thermos cups to enter the pre-vacuumizing chamber from the loading platform and park at a first designated position through the second track;

ejecting, by the ejection mechanisms, the feeding frame away from the controllable and movable feeding trolley and exiting the controllable and movable feeding trolley from the pre-vacuumizing chamber to the loading platform;

descending and resetting the ejection mechanisms carrying the feeding frame;

closing the vertically movable inlet valve;

starting a low-vacuum pumping operation after the vertically movable inlet valve is closed;

accelerating a pre-vacuumizing speed and starting a preheating after a vacuum degree reaches $4\times10^{2}$ Pa; and stopping the preheating at 200° C.; and completing a pre-vacuumizing when the vacuum degree reaches $4\times10^{-1}$ Pa;

S2: opening the vertically movable gate valve of the heating chamber after the pre-vacuumizing is completed;

ejecting, by the ejection mechanisms in the pre-vacuumizing chamber, the feeding frame;

allowing the controllable and movable feeding trolley in the heating chamber to enter the pre-vacuumizing chamber and park at a second designated position through the first track;

descending the ejection mechanisms to place the feeding frame on the controllable and movable feeding trolley;

allowing the controllable and movable feeding trolley carrying the feeding frame to enter the heating chamber through the first track, and closing the vertically movable gate valve of the heating chamber, wherein at this time, step S1 is repeated in the pre-vacuumizing chamber; after the vertically movable gate valve of the heating chamber is closed, a high-vacuum pumping operation is started, and a furnace is heated to a temperature of 450° C.; and when the vacuum degree reaches $1\times10^{-3}$ Pa, the temperature of 450° C. is hold for 20 min, and a getter is activated;

S3: performing the high-vacuum pumping operation synchronously in the welding chamber and the heating chamber until the vacuum degree in the welding chamber reaches $1\times10^{-3}$ Pa and a temperature of the welding chamber reaches 450° C. and is maintained;

opening the vertically movable gate valve of the welding chamber after the getter is activated in step S2;

allowing the controllable and movable feeding trolley carrying the feeding frame to enter the welding chamber and park at a third designated position through the first track;

ejecting, by the ejection mechanisms, the feeding frame away from the controllable and movable feeding trolley, allowing the controllable and movable feeding trolley to return the heating chamber;

descending and resetting the ejection mechanisms carrying the feeding frame, and closing the vertically movable gate valve of the welding chamber, wherein at this time, step S2 is repeated in the heating chamber; resetting a laser welding gun of the controllable and movable laser welding device to a zero position after the vertically movable gate valve of the welding chamber is closed; and performing a welding in sequence from the zero position through the at least one transparent window according to a preset progress parameter corresponding to a spacing of the thermos cups on the feeding frame, the welding ball and a vacuumizing hole of the thermos cups are melted together by the laser welding gun to complete the welding;

S4: opening the vertically movable gate valve of the cooling chamber after the welding is completed;

ejecting, by the ejection mechanisms in the welding chamber, the feeding frame;

allowing the controllable and movable feeding trolley in the cooling chamber to enter the welding chamber and park at a fourth designated position through the first track;

descending the ejection mechanisms to place the feeding frame on the controllable and movable feeding trolley;

allowing the controllable and movable feeding trolley carrying the feeding frame to enter the cooling chamber through the first track, and closing the vertically movable gate valve of the cooling chamber, wherein at this time, step S3 is repeated in the welding chamber;

monitoring a temperature and a pressure of the cooling chamber after the vertically movable gate valve of the cooling chamber is closed;

opening an inflation valve to fill the cooling chamber with an air or nitrogen when the temperature of the cooling chamber drops to 230° C.; and completing a cooling when the pressure of the cooling chamber is the same as an external pressure; and S5: opening the vertically movable outlet valve after the cooling is completed;

allowing the controllable and movable feeding trolley carrying the feeding frame to enter the unloading platform and park at a fifth designated position through the second track;

unloading; and allowing the controllable and movable feeding trolley to return the cooling chamber, and closing the vertically movable outlet valve, wherein at this time, step S4 is repeated in the cooling chamber.

10. The thermos cup vacuumizing method according to claim 9, wherein in the step S3, before the controllable and movable laser welding device starts the welding, a controllable and movable visual scanning camera provided above the welding chamber scans welding positions of all the thermos cups through the at least one transparent window; and the laser welding gun performs the welding at the welding positions through the at least one transparent window based on a visual scanning result, such that the welding ball and the vacuumizing hole of the thermos cups are melted together.

11. The thermos cup vacuumizing device according to claim 8, wherein the feeding frame is provided with a positioning fixture, the positioning fixture is configured to place each of the thermos cups and is in an insertion connection with the feeding frame.

12. The thermos cup vacuumizing device according to claim 1, wherein the ejection mechanisms in each set are symmetrically arranged on an outer side of the first track;

an edge of the feeding frame protrudes from an edge of the controllable and movable feeding trolley;

the ejection mechanisms each comprise an ejection rod, the ejection rod is located below the edge of the feeding frame and connected to the power source; and under an action of the power source, the ejection rod pushes up the edge of the feeding frame to eject the feeding frame away from the controllable and movable feeding trolley.

13. The thermos cup vacuumizing device according to claim 12, wherein the feeding frame is provided with a positioning fixture, the positioning fixture is configured to place each of the thermos cups and is in an insertion connection with the feeding frame.

14. The thermos cup vacuumizing device according to claim 1, further comprising a feeding frame, wherein the feeding frame is provided with a positioning fixture, the positioning fixture is configured to place each of the thermos cups and is in an insertion connection with the feeding frame.

15. The thermos cup vacuumizing device according to claim 1, wherein the feeding frame is provided with a positioning fixture, the positioning fixture is configured to place each of the thermos cups and is in an insertion connection with the feeding frame.

* * * * *